Nov. 22, 1966 P. FAHLENBERG 3,286,610
PHOTOGRAPHIC CAMERA
Filed Nov. 10, 1964 2 Sheets-Sheet 1
Fig. 1
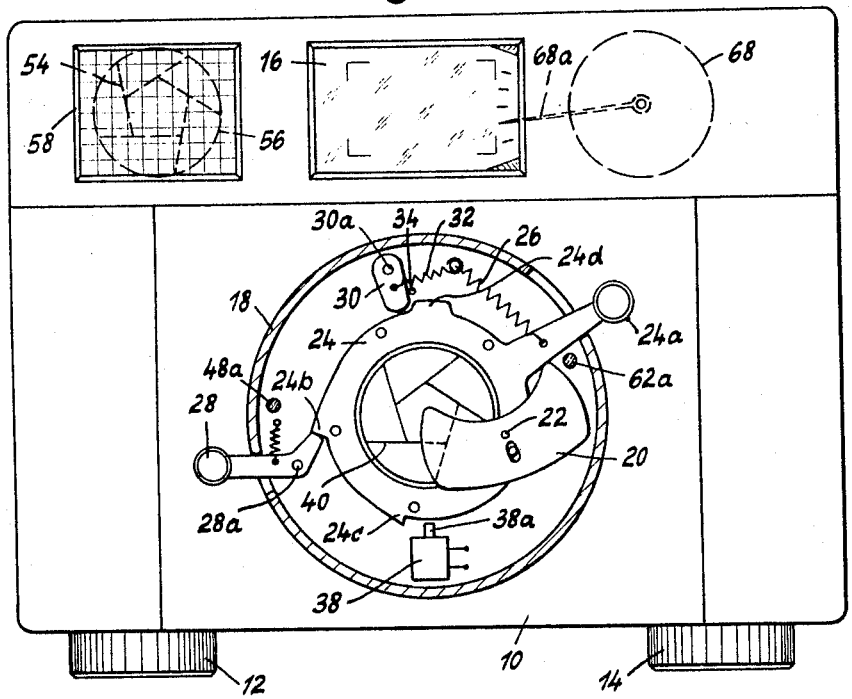
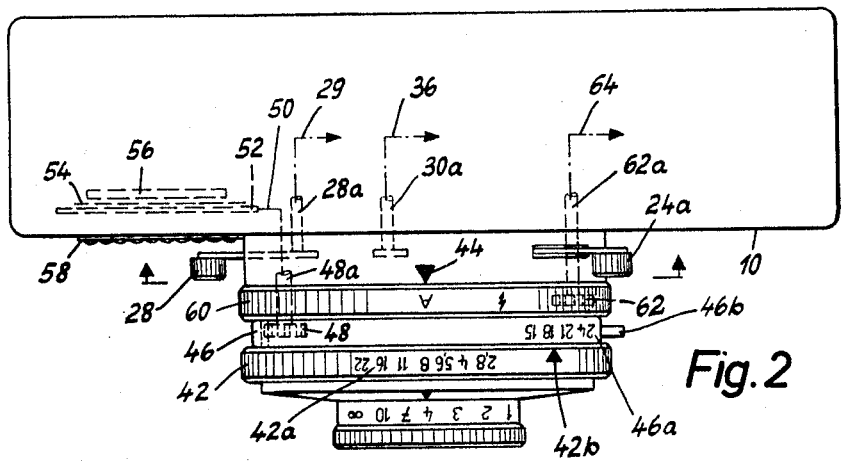
Fig. 2

United States Patent Office 3,286,610
Patented Nov. 22, 1966

3,286,610
PHOTOGRAPHIC CAMERA
Paul Fahlenberg, Baierbrunn, near Munich, Germany, assignor to Compur-Werk Gesellschaft mit beschrankter Haftung & Co., Munich, Germany, a German firm
Filed Nov. 10, 1964, Ser. No. 410,164
Claims priority, application Germany, Nov. 19, 1963, C 31,464
4 Claims. (Cl. 95—10)

This invention relates to a photographic camera, and more particularly to a camera having electrical means for controlling the shutter speed or duration of exposure.

An object of the invention is the provision of a generally improved and more satisfactory camera of this kind.

Another object is the provision of an improved camera having electrical means for controlling the shutter speed or duration of exposure, so designed that the user is given an indication of what the shutter speed will be, when controlled by the electrical mechanism, so that he will know whether this speed is satisfactory for his purposes.

Still another object is the provision of a simple and sturdy camera construction incorporating means for manually setting certain factors which affect the exposure (for example, diaphragm aperture or film sensitivity or both) whereupon electrical means incorporated in the camera construction automatically determines another exposure factor (for example, the shutter speed or duration of exposure) while at the same time the user is given an advance indication of what the shutter speed will be under the prevailing conditions, so that if the indicated shutter speed is not satisfactory for his purposes, he can change a manually settable factor and thereby cause a change in the indicated shutter speed, before actually making the exposure.

A further object is the provision of electrical control means for the camera, so designed and constructed as to be particularly simple and comparatively inexpensive, easy to manufacture, and rugged and reliable in use.

These and other desirable objects may be attained in the manner disclosed as an illustrative embodiment of the invention in the following description and in the accompanying drawings forming a part hereof, in which:

FIG. 1 is a front elevation of a camera in accordance with a preferred embodiment of the invention;

FIG. 2 is a top plan view of the same; and

Figure 3:
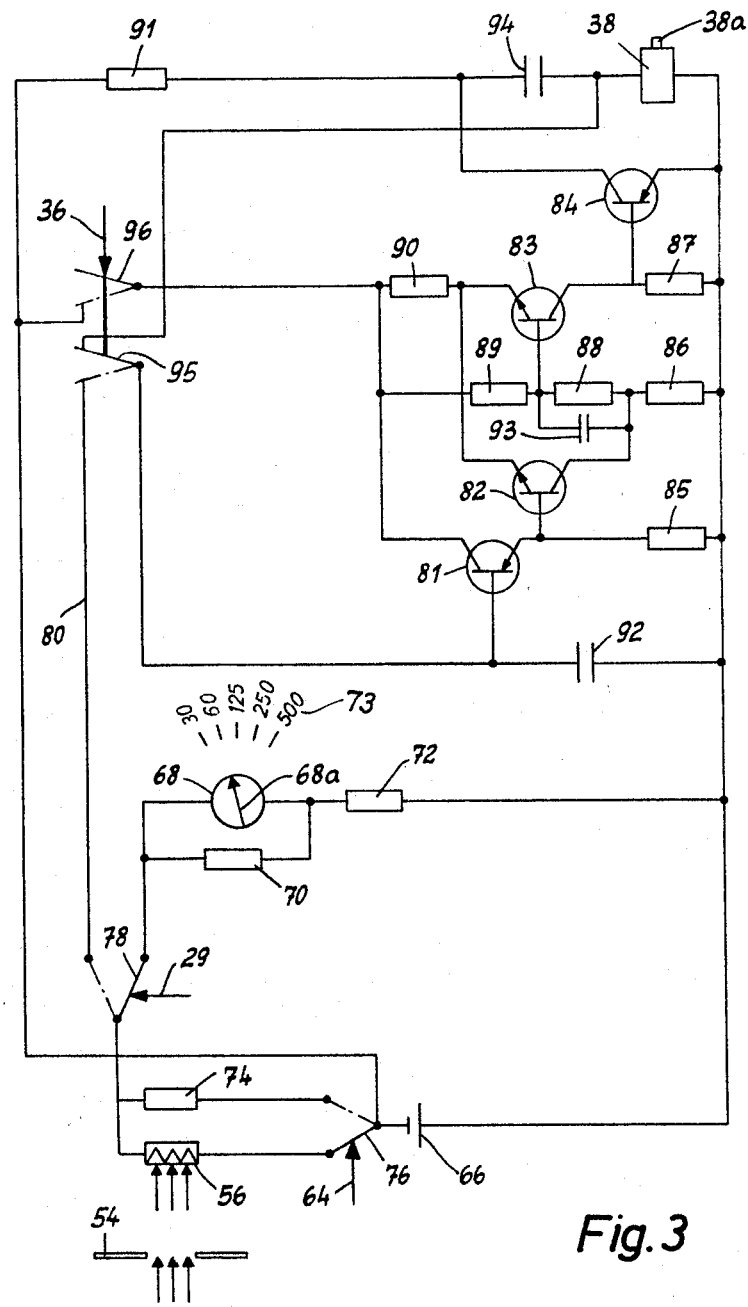
FIG. 3 is an electrical circuit diagram illustrating a preferred form of the invention.

The photographic camera here illustrated as a preferred embodiment of the invention is in general of well known construction except for the features described below. It comprises, for example, a main body or housing indicated in general at 10, having a film winding knob 12, a rewinding knob 14, and a viewfinder 16. A shutter of the objective type is mounted within the shutter casing or housing 18 of the usual annular construction. The shutter is provided with blades 20 mounted on fixed pins 22, any suitable number of such blades being used, as well understood in the art. A convenient number is five blades, but only one of them has been illustrated in FIG. 1, for the sake of clarity. Conveniently, the blades are of what is sometimes called the double-ended form, the exposure aperture being closed in both of the extreme or limit positions of the blades, and being opened as the blades swing from one limit position through an intermediate position to the other limit position. The blades are driven by means of a blade ring 24 having a main driving spring or master spring 26 associated therewith, the spring tending to turn the blade ring 24 in a counterclockwise direction when viewed from the front as in FIG. 1. The blade ring may be turned in a clockwise direction, to tension or load the spring 26, by clockwise manual pressure applied to an arm 24a which extends outwardly through a circumferential slot in the shutter housing 18, to a manually accessible position. The blade ring is then held in its tensioned or cocked position by a trip or trigger member 28 fixed to a shaft 28a and engaging behind a shoulder 24b on the blade ring, to hold the blade ring in its tensioned position. The end of the trigger lever 28 extends out through a slot in the casing, to an accessible position, as seen in FIG. 1. The shaft 28a to which the trigger member 28 is fixed, extends rearwardly from the shutter assembly into the camera body, where it is provided with a cam or operating member schematically shown at 29, for operating an electric switch 78 (FIG. 3) as further described below.

The above mentioned construction, where the trigger holds a blade ring which is pivotally connected to the blades and which moves in a single direction both to open and to close the blades, is suitable for use with double-ended or two-lobe blades, as illustrated. Those skilled in the art will recognize, however, that if one prefers to employ single lobe blades which move first in one direction to open the exposure aperture and then in the opposite direction to close the aperture, the blades will be pivotally connected to a blade ring which rotates first in one direction to open the blades and then in the opposite direction to close the blades, and this blade ring will be driven in the conventional manner, first in one direction and then in the other, by movement in a single direction of what is commonly called a master member. In such a construction the trigger would, of course, serve to hold the master member rather than the blade ring, and the electrically operated latch for holding the blades temporarily open to determine the length of exposure, as further described below, would operate upon the master member rather than upon the blade ring. Since the present invention is applicable to both types of shutter, the expression "blade operating member" is intended to refer to either the blade ring or the master member, as the case may be.

When using double-ended blades such as here illustrated, which have to be returned from rest or run-down position to initial starting position before making the next exposure, the usual conventional masking blades, sometimes collectively referred to as a "shutter blind," are employed to prevent passage of light through the exposure aperture during the tensioning or cocking of the shutter to restore the blades to their initial starting positions. Such masking blades or shutter blinds, being well known in the art, are omitted from the drawings for the sake of clarity. Of course it is not necessary to use such masking blades, if the shutter blades themselves are of the single lobe type which do not require to be moved from their closed positions between successive exposures.

On the periphery of the blade operating member 24 is a cam portion 24d which, at the beginning of the running down movement of the blade operating member, serves to displace a lever 30 mounted in the shutter assembly and fixed to a shaft 30a which extends rearwardly into the camera body and is provided with a cam or operating part illustrated diagrammatically at 36, for operating the electric switches 95 and 96 (FIG. 3) at the beginning of the running down movement of the blade operating member, as will be further described below. A spring 32 tends to swing the lever 30 to its normal or initial position against a stop 34.

An electro-magnet 38 is also installed in the shutter casing. Its armature (or any suitable member operatively connected to the armature) is illustrated at 38a, and in the normal rest position or non-energized position, it projects into the path of travel of a latching shoulder 24c on the blade operating member 24 and serves as a latch or stop to hold the blade operating member 24 in an intermediate position in which the shutter blades are open. When the electro-magnet 38 is energized, this withdraws the member 38a from the shoulder 24c and the blade operating member 24 is then allowed to continue its running down movement under the influence of the master spring 26, to close the shutter blades. The electrical connections for controlling the electro-magnet 38 will be further described below.

A diaphragm arrangement of any suitable known form is also installed in the shutter casing or housing 18, the diaphragm leaves being schematically shown at 40. The usual conventional diaphragm control ring (not shown) is pivotally connected to the leaves 40, rotation of the control ring about the optical axis serving to vary the diaphragm aperture in known manner. The diphragm control ring, in turn, is operatively connected to an external and manually accessible diaphragm setting ring 42 which likewise rotates concentrically with the other rings about the optical axis as a center. The diaphragm setting ring 42 is provided with a diaphragm aperture scale 42a marked circumferentially on its periphery and read in conjunction with a fixed reference mark or index point 44. The scale 42a is graduated in any suitable units, preferably in terms of the usual f numbers as illustrated in FIG. 2 of the drawings.

Immediately to the rear of the diaphragm setting ring 42 is another ring 46, concentric with the ring 42 and releaseably coupled to it by any suitable form of releasable coupling means such as frequently used for coupling a diaphragm aperture setting ring to a film speed or film sensitivity setting ring. For example, the coupling may take the form illustrated in FIGS. 4 and 5 of the drawings of Gebele Patent 3,044,376, granted July 17, 1962, and the coupling may be released in order to turn the rings relative to each other, by radially inward pressure on the release plunger 46b, corresponding to the release plunger 22d in the Gebele patent. When the coupling is released, one ring may be turned relative to the other so as to bring the index mark 42b on the ring 42 opposite any desired graduation of the film speed or film sensitivity scale 46a marked on the circumference of the ring 46, thus introducing into the system the variable factor of film sensitivity.

The ring 46 is provided with internal gear teeth meshing with a pinion 48 fixed to a shaft 48a extending rearwardly into the camera body and connected through any suitable connection or driving means shown schematically at 50, to a rotatable ring 52 which controls light restricting means, such as an iris diaphragm 54, which lies in front of a photo-electric element 56 which may be, for example, in the form of a cadmium sulphide resistance. A window 58 in the front wall of the camera lies in front of the light restricting diaphragm 54 and photo element 56, so that the amount of light reaching the element 56 depends in part upon the brightness of light falling upon the window 58, and in part upon the size of opening of the diaphragm 54, which size of opening is controlled, in turn, by the position of the diaphragm setting ring 42 as modified by the film speed setting which determines the relative orientation of the rings 42 and 46.

A selector ring or switching ring 60 is also mounted on the shutter casing, immediately to the rear of the ring 46, and rotates concentrically with the rings 42 and 46 about the optical axis as a center. This ring has two graduations or markings circumferentially spaced from each other on its periphery, one being the mark "A" and the other being a symbol of a lightning flash, conventionally used in this art to denote a setting for flashlight pictures as distinguished from natural light pictures. These markings are read in conjunction with the main reference point 44. When the mark "A" is opposite the reference point 44, as seen in FIG. 2, the selector ring is set for automatic determination of the shutter speed or duration of exposure. When the ring 60 is turned to bring the "flash" mark opposite the reference point 44, the mechanism is set for taking a flashlight picture, as will be further described below. The ring 60 has internal gear teeth meshing with a pinion 62 fixed to a shaft 62a extending rearwardly into the camera body and provided with a cam or suitable operating member schematically illustrated at 64 for operating an electric switch 76 (FIG. 3) as further described below.

The electrical connections are indicated diagrammatically in FIG. 3. The camera contains an electric battery 66 connected, when the switch 76 is in the position illustrated in solid lines, to the photo resistance 56 which has been described above. Through the photo resistance 56, the circuit continues to the switch 78 and, when this switch in in its solid line position as illustrated, the circuit continues on to a meter 68 of conventional form, provided with a pointed or indicator 68a. There is a resistance 70 in shunt or parallel with the meter 68, and a resistance 72 in series with the meter, the circuit then going back to the second side of the battery 66 after passing through the resistance 72.

Preferably the pointer or indicating member 68a of the meter is visible through the viewfinder 16 of the camera, at one edge thereof, as illustrated in FIG. 1. Preferably also there is a scale in connection with the pointer, the scale (shown at 73 in FIG. 3) preferably being graduated in terms of shutter speed, with the numbers indicating denominators of fractions of a second. Thus the graduations "30" and "60," for example, indicate 1/30 and 1/60 of a second, respectively, as well understood in the art.

The function of the resistances 70 and 72 is, to adapt the characteristics of the meter 68 to the characteristics of the photo resistance 56. There is another and constant resistance 74 which may be connected in the battery circuit in place of the photo resistance 56, by shifting the selector switch 76 from the full line position to the broken line position shown in FIG. 3. As already mentioned, the switch 76 is controlled through the connections 62a, 64 from the selector ring 60. The parts are arranged so that when the selector ring 60 is in the "A" or automatic position, the switch 76 is in the full line position shown in FIG. 3, so that the photo resistance 56 is operative in the battery circuit and the fixed resistance 74 is inoperative. When the selector ring 60 is shifted to the flash position, the selector switch 76 is swung to the broken line position shown in FIG. 3, wherein the photo resistance 56 is ineffective and the fixed resistance 74 is effective. This fixed resistance has a value such that the exposure duration will be long enough for a flash photograph, for example, a shutter speed of 1/30 of a second.

In the above described battery circuit through the meter, there is a switch 78 which, as previously mentioned, is operated by the operating member 29 connected to the shutter trip or trigger 28 (sometimes referred to as the shutter release). When the trigger 28 is in its normal rest position illustrated in FIG. 1, holding the blade operating member 24 in its tensioned position or initial starting position ready for an exposure, the switch 78 is in the full line position shown in FIG. 3, connecting the battery to the meter as illustrated. When the trigger 28 is moved to release the blade operating member 24 to begin its running-down or exposure-making movement, this shifts the switch 78 to the broken line position, whereby the meter 68 is disconnetced from the battery and the battery circuit goes, instead, through the second position of the switch 78 to the conductor 80, and thence to the switch 95 which is one of two separate switches 95 and 96 operatively connected to each other to move in unison and operated by the previously mentioned lever 30 which is swung by the portion 24d of the blade operating member 24 immediately at the beginning of the running-down movement of the blade operating member. Thus at the beginning of the exposure operation, the battery circuit is operatively disconnected from the meter 68 and is operatively connected, through the shifted switches 78 and 95, so as to initiate operation of the resistance-capacitance transistorized time control circuit, sometimes referred to as the R–C circuit, which will now be described.

The R–C control circuit comprises four transistors indicated at 81 to 84, inclusive, together with resistances 85 to 91, inclusive, and condensers or capacitors 92, 93, and 94, all of these being connected to each other in the manner illustrated in FIG. 3, which will be clearly apparent to those skilled in the field of transistor circuits. The above mentioned switch 95, when in the solid line position, serves to short circuit the capacitor 92 through the coil of the electro magnet 38. The switch 96, when in its full line position, is entirely open and ineffective, but when shifted to its broken line position (by movement of the lever arm 30 at the beginning of the running-down movement of the shutter) it serves to connect the battery potential to the R–C circuit through the connections readily apparent in FIG. 3.

The transistors 82 and 83, together with their collector resistances 86 and 87 and the voltage divider resistances 88 and 89 and the common emitter resistance 90, act as a Schmitt trigger circuit. The Schmitt trigger circuit is well known, per se, in the transistor circuit art and need not be further described here. It is explained in various reference books, such for example as in paragraph 196, page 208, of the United States Army Technical Manual 11–690, "Basic Theory and Application of Transistors," published by the U.S. Government Printing Office, Washington, D.C., in 1959.

A trigger circuit of this nature has the ability, when the base of the transistor 82 has reached a specific potential (positive in this system), of rocking over so that the transistor 83 becomes conductive instead of the transistor 82 which was previously conductive. This rocking produces an abrupt voltage drop at the resistance 87. As a consequene of this voltage drop, the transistor 84, which serves as a switch, becomes conductive. As a result, the capacitor 94, previously charged with battery voltage through the resistance 91, discharges through the winding of the electro magnet 38 and the conductive switch transistor 84. The discharge through the winding of the electro magnet 38 withdraws the armature member 38a from its blocking relation to the shutter blade operating member 24, thus allowing the shutter blade operating member to resume its running-down motion and to close the shutter blades from the open position in which they were held by the armature member 38a.

The trigger connections must have an impulse at the secondary side which is enough to operate the switch transistor 84. For this purpose, it is necessary that the trigger should not be given too small a current. On the other hand, it is advantageous to furnish the time-controlling member of the system with condensers or capacitors which are as small as possible, and large resistances. This requirement can be met when there is disposed, in advance of the base of the transistor 82, a transistor which is in an emitter condition, and this transistor, shown at 81, functions as an impedance converter and reduces the control current in this way. In appropriate cases, the time controlling R–C circuit can be made substantially smaller by the provision of a plurality of preliminary stages of this character.

As already mentioned, the selector switch 76 may be operated through the driving member 64 controlled by the position of the setting ring 60, settable for either automatically timed daylight exposures or for flashlight exposures. The switch 78, on the other hand, is functionally coupled to the operating element 29 and as a result it is operated by the movement of the trip or trigger member 28. The switches 95 and 96, as already mentioned, are operated by the control lever 30 which is moved at the beginning of the running down movement of the shutter blade operating member 24.

The camera is used as follows:

The coupling between the rings 42 and 46 is disengaged by inward radial pressure on the plunger 46b, and the rings are set to a position of relative orientation dependent upon the film speed or sensitivity of the film being used in the camera, using the film speed scale 46a and the pointer or reference mark 42b. Assuming that the shutter has been tensioned or cocked and that the film has been advanced to bring a fresh unexposed area or "frame" into the focal plane, the coupled setting rings 42 and 46, now rotating together as a unit, are turned manually until the desired diaphragm aperture value on the diaphragm aperture scale 42a lies opposite the main reference mark 44. This movement adjusts the diaphragm leaves 40 to the indicated aperture, and simultaneously, through the connections 48, 50, 52, moves the photocell diaphragm or light restrictor 54 to a corresponding position.

If a daylight photograph is to be taken, the user sets the switching ring or selector ring 60 to a position in which the mark "A" lies opposite the main reference point 44. As a result, the switch 76 will connect the battery circuit to the photo resistance 56, cutting out the fixed resistance 74. With the shutter in its tensioned or cocked condition, the switch 78 will be in the position shown in solid lines in FIG. 3, whereby the meter 68 is connected to the battery circuit. As soon as the camera is pointed toward the scene to be photographed, the light falling on the photo resistance 56 will allow the battery current to flow through the meter 68, the current corresponding to the brightness of the subject as restricted (by the member 54) in accordance with the previously set diaphragm aperture and the film speed. The indicator 68a of the meter 68 accordingly assumes a corresponding position where it may be seen through the viewfinder 16, at one margin thereof. This margin of the viewfinder may be provided with transparent colored portions to indicate a range of positions of the pointer 68a in which an acceptable photograph may be made, and to give a warning to the operator when the pointer 68a lies outside of the acceptable range. For example, the central part of the margin of the viewfinder in which the pointer is visible, may be tinted green, and beyond the green range (at top and bottom of the right hand margin of the viewfinder, when seen as in FIG. 1) the margin may be tinted red, or may be blocked off completely. Also, the margin is preferably provided with a scale graduated in terms of shutter speed, such as the scale indicated at 73 in FIG. 3.

If the user finds that the pointer 68a lines within the green tinted part or range, he knows that under prevailing light conditions of the subject, an acceptable photograph can be taken. Moreover, by referring to the scale of exposure times, he will see at what shutter speed the photograph will be taken, so long as the light conditions remain the same and the diaphragm aperture which he has previously set remains unchanged. If he is not satisfied with the indicated shutter speed, he can reset the diaphragm to a larger or smaller aperture by turning the ring 42, and this will, of course, change the aperture not only of the main diaphragm 40 but also of the restricting diaphragm 54, thereby changing the amount of light falling on the photo resistance 56, causing a change in the current flowing through the meter 68, and correspondingly changing the position of the meter pointer 68a. Therefore, in advance of actually taking the photograph, the user may try various settings of the diaphragm, and at each setting he may observe what the corresponding shutter speed would be if the photograph were then taken. If the pointer does not appear in the green tinted range, but rather in the red tinted range or is completely blocked from view, the user knows that a photograph cannot be taken, and he tries a different diaphragm setting.

When the user is satisfied as to the diaphragm setting and the indicated shutter speed, he operates the shutter release or trigger 28. The parts are so designed that just before the trigger actually releases the blade operating member 24, it first shifts the switch 78 from the full line position to the broken line position shown in FIG. 3. This disconnects the photo resistance 56 from the meter 68, and connects it to the conductor lead 80. Further movement of the release or trigger 28 releases the blade operating member 24, which then starts to turn or run down under the influence of the master spring 26, until it reaches a position in which the blades are fully open, at which time the running down movement of the member 24 is temporarily stopped by the armature 38a of the electro magnet 38.

Right at the commencement of the running down movement of the blade operating member 24, the cam 24d has rocked the control lever 30 in a clockwise direction, so that the double switch 95, 96 is swung over from the full line position to the broken line position shown in FIG. 3. The capacitor 92 is now charged from the battery 66, through the photo resistance 56. As the charge in this capacitor increases, the voltage drop at the resistance 85 also increases until, after a predetermined period of time which depends upon the factors of brightness, diaphragm aperture, and film sensitivity, the transistor 82 arrives at its blocking range and the trigger switch is rocked. At this moment the transistor 83 suddenly becomes conductive, and the impulse emitted through the resistance 87 from the transistor 84 brings about a discharge of the capacitor 94 through the winding of the electro magnet 38, as a result of which the winding is momentarily energized and attracts its armature 38a. This releases the blade operating member 24, so that it may resume its running down motion to its rest position, thereby closing the shutter blades 20.

In this way, a photograph is taken with a shutter speed or duration of exposure which has been automatically adjusted in accordance with the factors of diaphragm aperture, film speed, and brightness of illumination of the subject. Until the instant of taking the photograph, the user has been able to observe the indicated shutter speed, or speed (duration of exposure) at which the photograph would then be taken by the automatic speed adjusting or duration adjusting mechanism, if the trigger or release were then operated.

If a flashlight photograph is to be taken, rather than a daylight photograph, the setting ring 60 is adjusted to the "flash" position, which serves to shift the switch 76 from the full line position to the dotted line position shown in FIG. 3. This cuts out the photo resistance 56 and introduces the fixed resistance 74 into the battery circuit. The resistance 74 is so chosen as to give a constant exposure speed or duration which is sufficient for flashlight photographs, for example, 1/30 of a second. Otherwise, the mechanism operates the same as when taking daylight photographs.

To insure that the trip or trigger 28 does not return to its rest position before the electro magnet 38 has been energized, in the case of long exposure periods, a known form of locking means is provided to hold the trip or trigger in its depressed release position until the armature 38a again frees the nose 24c of the blade operating member 24 for further travel.

The switching system in accordance with the invention provides a regulating arrangement which is controlled in accordance with the light conditions, and which gives a pre-indication of the duration or speed of exposure. It accomplishes this with a relatively small requirement of constructional elements. A further advantage arises from the fact that the unavoidable ageing of the photo elements cannot produce errors, because the value of the indications in the metering mechanism always corresponds to the regulating values in the R–C circuit. In addition, the meter which gives the indicating signal can be used in known fashion to check operative condition of the battery.

The turning movements of the coupled rings 42 and 46, for adjusting the aperture of the diaphragm of the camera, have been described as operating a restrictor diaphragm 54 to restrict the light falling upon the photo resistance 56 and thereby alter the resistance of the circuit passing through the element 56. Instead of this, the movements of the rings 42, 46 may, if desired, operate a variable resistance interposed in the circuit of the photo resistance 56. The result is the same in either case, that the current flowing through the circuit of the photo resistance 56 depends in part upon the brightness of the light and in part upon the setting of the rings 42 and 46.

Those skilled in the art of transistor circuitry will readily be able to select suitable values and characteristics for the resistances, capacitors, transistors, and other components of the electric circuit, and will readily understand that such values and characteristics can be changed within wide limits. Merely as an illustrative example of suitable values and characteristics, and not as a limitation on the invention, it may be stated that the following have been found satisfactory: the winding of the electro magnet 38 may have a resistance of 20 ohms. The photo resistance 56 may have a range from 100 ohms to 4 megohms. The battery 66 may have a potential of 12 volts. The meter 68 may have a resistance of 3000 ohms at a current of 10 microamperes. The resistances 70 and 72 may each have a resistance of 8000 ohms, while the resistance 74 may have a rating of 20,000 ohms, the resistance 85 a rating of 22,000 ohms, the resistances 86 and 87 each a rating of 390 ohms, the resistance 88 a rating of 4,700 ohms, the resistance 89 a rating of 3,900 ohms, the resistance 90 a rating of 180 ohms, and the resistance 91 a rating of 2,000 ohms. The transistor 81 may be type OC 460; the transistors 82 and 83 may each be type 2N 2713; and the transistor 84 may be type OC 308. The capacitor 92 may have a rating of 2 microfarads, the capacitor 94 a rating of 100 microfarads, and the capacitor 93 a rating of 50 picofarads. As above stated, these are merely examples of suitable values, which can be changed within the skill of the art, without departing from the invention.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a shutter, an electronic control arrangement for establishing the speed of an exposure made by said shutter, an electric circuit having a portion including a photo-resistance responsive to light reflected from an object to be photographed, means for varying the resistance value of said portion of said circuit to introduce into said portion of said circuit the exposure factor of film sensitivity, an electrically operated shutter speed indicating meter, and switch means for operatively connecting said portion of said circuit alternatively either to said indicating meter, to cause said meter to indicate what the shutter speed would be if an exposure were then made under prevailing conditions of light and film sensitivity, or to said arrangement, to cause the resistance value of said portion of said circuit to control said arrangement in timing the speed of an exposure.

2. A photographic camera comprising a shutter, an electronic control arrangement for establishing the speed of an exposure made by said shutter, an electric circuit having a portion including a photo-resistance responsive to light reflected from an object to be photographed, means for varying the resistance value of said portion of said circuit to introduce into said portion of said circuit the exposure factor of film sensitivity, an electrically operated shutter speed indicating meter, means for initiating an exposure-making operation of said shutter, and a switch operated by said initiating means and effective to connect said portion of said circuit operatively to said meter prior to initiating an exposure so that said meter may respond to the resistance value of said portion of said circuit as influenced by the exposure value of film sensitivity and effective upon initiating an exposure to disconnect said portion of said circuit from said meter and to connect it operatively to said arrangement so that it may influence said arrangement in controlling the speed of an exposure.

3. A photographic camera comprising a shutter including a blade operating member movable in a running-down movement from a tensioned position to a rest position and effective during such running-down movement to open and close shutter blades to make an exposure, a movable trigger member for holding said blade operating member in tensioned position and for releasing it therefrom to make its running-down movement, means including an electromagnet and an electronic control arrangement electrically connected thereto for delaying the running-down movement of said operating member to time the duration of the exposure, a meter, an electric circuit having a portion including a photo-resistance whose electrical resistance varies in accordance with light reflected from the subject to be photographed, means for varying the resistance of said portion of said circuit also in accordance with a variable exposure factor other than diaphragm aperture and shutter speed, an electric switch effective in a first position to connect said portion of said circuit operatively to said meter and disconnect it from said electronic control arrangement and effective in a second position to connect said portion of said circuit operatively to said electronic control arrangement and disconnect it from said meter, and an operative connection between said trigger member and said switch to cause said switch to be in said first position so long as said trigger member holds said blade operating member in tensioned position and to cause said switch to move to said second position when said trigger member is moved to release said blade operating member for a running-down movement.

4. A photographic camera comprising a shutter including a blade operating member movable in a running-down movement from a tensioned position to a rest position and effective during such running-down movement to open and close shutter blades to make an exposure, a movable trigger member for holding said blade operating member in tensioned position and for releasing it therefrom to make its running-down movement, means including an electromagnet and a resistance-capacitor circuit electrically connected thereto for delaying the running-down movement of said operating member to time the duration of the exposure, a meter, a photo-resistance whose electrical resistance varies in accordance with light reflected from the subject to be photographed, a fixed resistance, a battery, a selector switch for operatively connecting one or the other of said last named resistances to said battery, a trigger switch operated by movement of said trigger member for operatively connecting the selected one of said last named resistances to said meter so long as said trigger member holds said blade operating member in tensioned position, and to said resistance-capacitor circuit and disconnecting it from said meter when said trigger member is moved to release said blade operating member for a running-down movement, an adjustable diaphragm for limiting passage of light toward a photosensitive element on which the exposure is to be made, manually adjustable means for controlling the size of the aperture of said diaphragm, manually adjustable means for setting a film sensitivity factor, factor introducing means for alterning the electrical response of the electrical circuit passing through said photo-resistance, said factor introducing means being under the joint control of said manually adjustable means for controlling the size of the aperture and said manually adjustable means for setting a film sensitivity factor, to enable the introduction into said circuit of a factor dependent partly upon the size of the aperture and partly upon the film sensitivity, said factor introducing means including an adjustable light-restricting diaphragm in partial light-blocking relation to said photo-resistance, and switch means moved from a first position to a second position during running-down movement of said blade operating member, said switch means serving in its first position to discharge a capacitor in said resistance-capacitor circuit and in its second position to cause said capacitor to be charged by current flowing through said photo-resistance.

References Cited by the Examiner

UNITED STATES PATENTS

| 3,063,354 | 11/1962 | Matulik et al. | 95—10 |
| 3,116,659 | 1/1964 | Waroux | 95—10 |
| 3,148,608 | 9/1964 | Rentschler | 95—10 X |
| 3,165,989 | 1/1965 | Kiper | 95—10 |
| 3,177,762 | 4/1965 | Ito | 95—10 X |
| 3,200,723 | 8/1965 | Topaz | 95—10 X |

OTHER REFERENCES

Werrmann: German application 1,164,822, printed March 5, 1964.

NORTON ANSHER, *Primary Examiner.*

J. F. PETERS, Jr., *Assistant Examiner.*